(12) United States Patent
Rankin et al.

(10) Patent No.: US 6,857,048 B2
(45) Date of Patent: Feb. 15, 2005

(54) PSEUDO LEAST-RECENTLY-USED (PLRU) REPLACEMENT METHOD FOR A MULTI-NODE SNOOP FILTER

(75) Inventors: Linda J. Rankin, Portland, OR (US); Kai Cheng, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 564 days.

(21) Appl. No.: 10/046,768

(22) Filed: Jan. 17, 2002

(65) Prior Publication Data

US 2003/0135696 A1 Jul. 17, 2003

(51) Int. Cl.[7] .............................................. G06F 12/00
(52) U.S. Cl. ........................ 711/133; 711/146; 711/119; 711/136
(58) Field of Search ................................ 711/133, 146, 711/119, 136

(56) References Cited

U.S. PATENT DOCUMENTS

| | | | | | |
|---|---|---|---|---|---|
| 5,966,729 | A | * | 10/1999 | Phelps ......................... | 711/146 |
| 6,049,847 | A | * | 4/2000 | Vogt et al. ................... | 710/309 |
| 6,304,945 | B1 | * | 10/2001 | Koenen ....................... | 711/141 |
| 6,347,360 | B1 | * | 2/2002 | Moudgal et al. ............ | 711/133 |
| 2002/0073281 | A1 | * | 6/2002 | Gaither ....................... | 711/122 |
| 2002/0095554 | A1 | * | 7/2002 | McCrory et al. ........... | 711/144 |
| 2003/0070016 | A1 | * | 4/2003 | Jones et al. ................. | 710/107 |

* cited by examiner

*Primary Examiner*—Mano Padmanabhan
*Assistant Examiner*—Paul A Baker
(74) *Attorney, Agent, or Firm*—Jeffrey B. Huter

(57) ABSTRACT

A Snoop Filter for use in a multi-node processor system including different nodes of multiple processors and corresponding processor caches is provided with a Pseudo Least-Recently-Used (PLRU) replacement algorithm to identify a least-recently-used (PLRU) line from the plurality of lines in the cache array for update to reflect lines that are replaced in the processor caches.

22 Claims, 4 Drawing Sheets

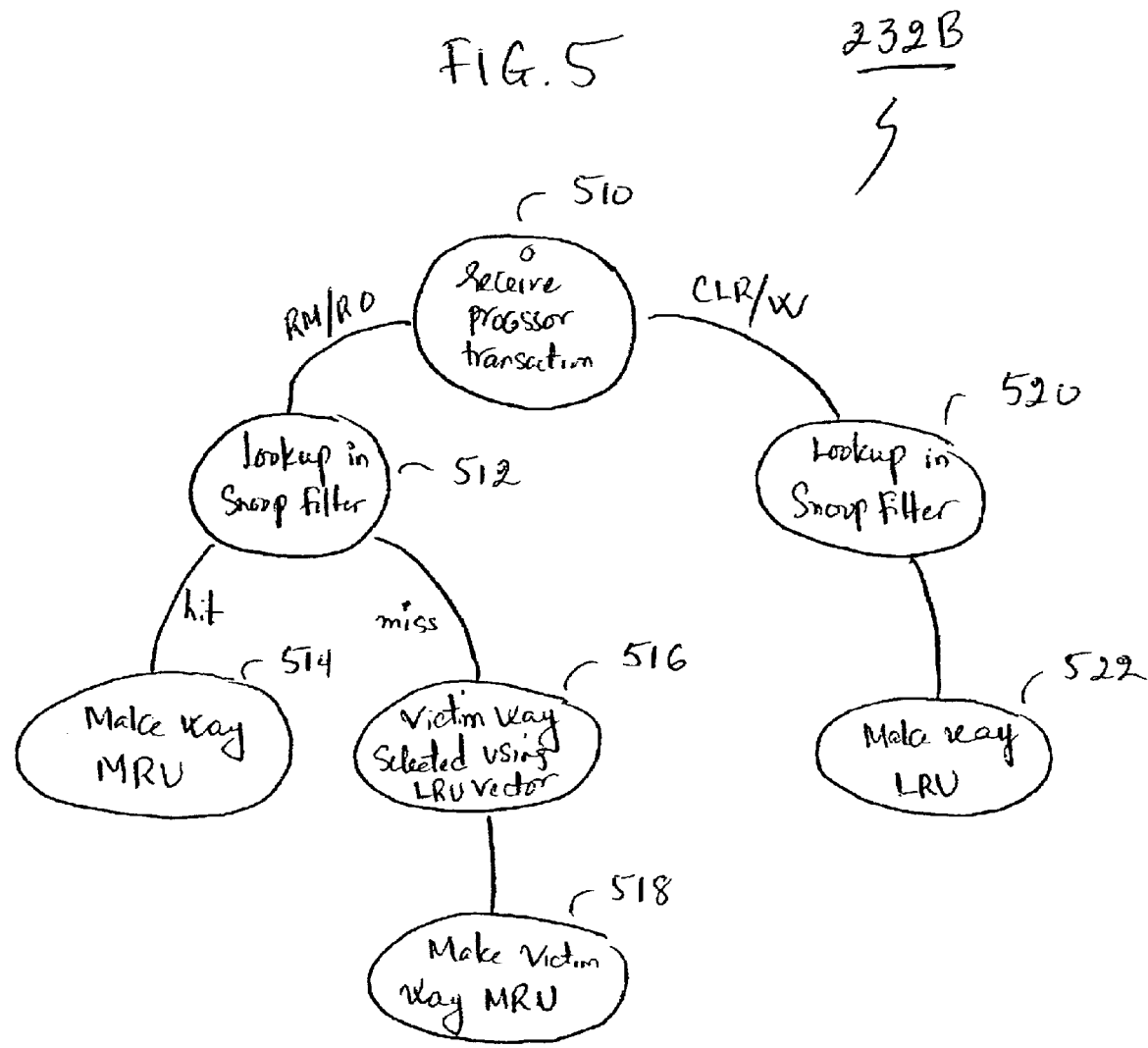

PSEUDO LEAST-RECENTLY-USED (PLRU) REPLACEMENT METHOD FOR A MULTI-NODE SNOOP FILTER

TECHNICAL FIELD

The present invention relates to memory subsystems used with high-speed digital processors and, more particularly, relates to a Pseudo Least-Recently-Used replacement (PLRU) method for a "Snoop Filter" in a multi-node processor system.

BACKGROUND

A simple way to increase the speed of a computer system is to increase the clock speed of its processor. However, when the clock speed is increased, the processor may stall and wait for data from main memory to continue processing.

In order to reduce memory access time in a typical computer system, special purpose high-speed memory spaces of static random access memory (RAM) called a "cache" are used to temporarily store data which are currently in use. For example, the cached data can include a copy of instructions and/or data obtained from main memory for quick access by a processor. A processor cache typically is positioned near or integral with the processor. Data stored in the cache advantageously may be accessed by the processor in a single processor cycle retrieving the data necessary to continue processing; rather than having to stall and wait for the retrieval of data from main memory.

When the processor requests a data item from main memory, the cache is accessed when the processor processes a memory access instruction. If the desired item, for example, data or program instruction, resides in the processor cache, this is called a cache "HIT" and the desired cache line is supplied to the processor immediately. If the desired data or program instruction is not found in the cache, this is a called cache "MISS". With a cache MISS, secondary memory (i.e., main memory storage) is accessed to read that item, and the data item requested is transferred from the main memory to the cache and the processor. A cache MISS causes the processor to wait or creates a stall, degrading system performance.

Various techniques are known for mapping physical main memory addresses into the processor cache memory locations, including a direct mapping cache configuration, a set-associative cache configuration, and a fully associative cache configuration. In addition, several cache line replacement algorithms are also known to replace or discard data from the processor cache when making room for new data. Examples include Round-Robin, First-in First-out (FIFO), and Least-Recently-Used (LRU) algorithms. The Round-Robin mechanism simply replaces cache lines in a sequential order. The FIFO mechanism determines which cache line is the first one saved, and that cache line is to be overwritten. The LRU algorithm attempts to identify which cache line is the least recently used, and that cache line is to be overwritten.

In a multi-node processor system, however, private processor caches may contain multiple copies of a given data item from main memory. All of these copies must be kept consistent (coherent); otherwise, data may be staled and effective access times can be reduced.

One recent solution to keep the private processor caches coherent in such a multi-processor system is to use a "Snoop Filter" implemented to manage information related to the cache line for cache coherency. A "Snoop Filter" is similar to a processor cache in that both the "Snoop Filter" and the processor cache can be organized as direct mapping, associative and set-associative caches. However, where a processor cache line contains data, the "Snoop Filter" line contains information related to the cache line in the multi-processor system (state and where the cache line is cached). In addition, where a processor cache has perfect knowledge of memory accesses of one or more processors, the "Snoop Filter" has imprecise knowledge of the cache lines in various processor caches. Nevertheless, there is no existing replacement algorithms that can be implemented in the "Snoop Filter" to replace or update the least recently used cache lines that are not in the processor caches to reflect the lines that are replaced in the processor caches.

Therefore, there is a need for the "Snoop Filter" to implement a Pseudo-Least-Recently-Used (PLRU) replacement algorithm to effectively update and reflect invalid entries in the "Snoop Filter" cache.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein:

FIG. 5 illustrates an example flowchart of an example Pseudo Least-Recently-Used (PLRU) replacement algorithm according to an embodiment of the present invention.

DETAILED DESCRIPTION

The present invention is applicable for use with all types of computer platforms and computer systems including Intel® Pentium® 4 Family of Processors or any new processors or chipsets which may become available as computer technology develops in the future. Such computer systems may include, but not limited to, general purpose computer systems (e.g., servers, laptop computers, desktop computers, palmtop devices, personal electronic devices, etc.), personal computers (PCs), hard copy equipments (e.g., printers, plotters, fax machines, etc.), banking equipments (e.g., automated teller machines) and the like. However, for the sake of simplicity, discussions will concentrate mainly on a multi-node computer platform with multiple processors, although the scope of the present invention is not limited thereto.

Figure 1:
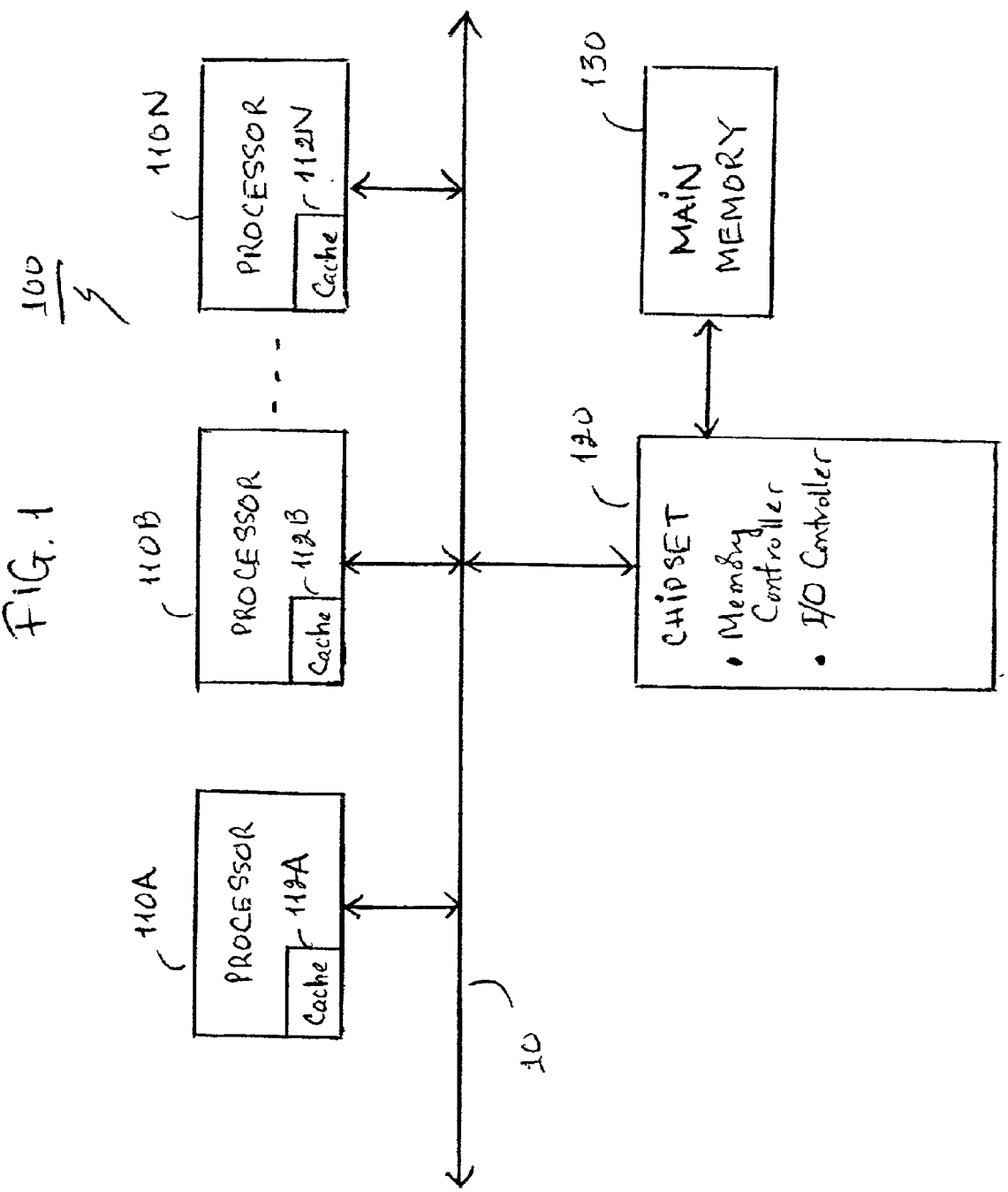
FIG. 1 illustrates a typical computer system with multiple processors.

Attention now is directed to the drawings and particularly to FIG. 1, an example multi-processor system 100 is illustrated. As shown in FIG. 1, the multi-processor system 100 may include a plurality of processors 110A–110N including private processor caches 112A–112N; a host chipset 120 connected to the processors 110A–110N via a system bus 10; and a main memory 130 connected to the processors 110A–110N, via the host chipset 120.

The processors 110A–110N may include any one of Intel® i386, i486, Celeron™ or Pentium® processors as marketed by Intel® Corporation, K-6 microprocessors as marketed by AMD™, 6x86MX microprocessors as marketed by Cyrix™ Corporation, Alpha™ processors as marketed by Digital Equipment Corporation™, 680x0 processors as marketed by IBM™. Processor caches 112A–112N are used to reduce the average memory access time. Such processor caches 112A–112N may also be organized in accordance with well-known direct mapped, set-associative, and fully associative cache schemes, and may contain an existing cache line replacement algorithm such as Round-Robin, First-in First-out (FIFO), and Least-Recently-Used (LRU) to replace or discard the least recently used cache line for processor cache efficiency.

The host chipset 120 may correspond to an Intel® 810, Intel® 870 and 8XX series chipset, for example, which includes a memory controller hub (MCH) for controlling the operation of the main memory 130, and an I/O controller hub (ICH) for controlling the operation of a variety of I/O devices, via a peripheral bus such as a Peripheral Component Interconnect (PCI) bus (PCI Local Bus Specification Revision 2.2 as set forth by the PCI Special Interest Group (SIG) on Dec. 18, 1998); and a plurality of Universal Serial Bus (USB) ports (USB Specification, Revision 2.0 as set forth by the USB Special Interest Group (SIG) on Apr. 27, 2000) and Ultra/66 AT Attachment (ATA) 2 ports (X3T9.2 948D specification; commonly also known as Integrated Drive Electronics (IDE) ports) used to provide an interface to one or more storage devices such as, for example, a hard disk drive (HDD), a compact disk read-only-memory (CD-ROM), a readable and writeable compact disk (CDRW), a digital audio tape (DAT) reader. I/O devices may include, but not limited to, a keyboard controller for controlling operations of an alphanumeric keyboard, a cursor control device such as a mouse, track ball, touch pad, joystick, etc., a mass storage device such as a magnetic tapes, a hard disk drive (HDD), a floppy disk drive (FDD), a memory stick and serial and parallel ports to printers, scanners, and display devices The main memory 130 may correspond to a dynamic random-access-memory (DRAM), but may be substituted for read-only-memory (ROM), video random-access-memory (VRAM), synchronous dynamic random-access-memory (SDRAM) and the like. Such main memory 130 may include a non-volatile memory such as a read-only-memory (ROM) which stores an operating system (OS) for use by the processors 110A–110N, and a volatile memory such as a random-access-memory (RAM), a static dynamic random-access-memory (SDRAM) or other memory devices such as RAMBUS DRAM which stores temporary information for use by the processors 110A–110N. The operating system (OS) may include any type of OS, including, but not limited to, Disk Operating System (DOS), Windows™ (e.g., Window™ 95/98, Window™ NT, and Window™ 2000), Unix, Linux, OS/2, OS/9 and Xenix, for use by the processors 110A–110N.

In such a multi-node processor system 100, all processor caches 112A–112N may contain multiple copies of information from the main memory 130. All of these copies must be kept consistent; otherwise, data may be staled and effective access times can be reduced. Common cache coherency protocols, known as MESI protocols, and any other modifications to the MESI protocols may be used to define rules governing state transitions and support multiple caching processors executing concurrently, writeback caching, and multiple levels of cache. MESI represents 4 possible states: M (modified), E (Exclusive), S (Shared), and I (Invalid) as described in the "*Pentium Pro Family Developer's Manual, Vol 1: Specification*" 1996, published by Intel Corp. However, as a number of processors and its node of multiple processors increase, the need to manage information related to all the cache lines and addresses becomes more prominent.

As a result, a "Snoop Filter" has been implemented to manage information related to the cache line. A "Snoop Filter" is similar to a processor cache in that both the "Snoop Filter" and the processor cache can be organized as direct mapping, associative and set-associative caches. However, where a processor cache line contains data, the "Snoop Filter" line contains information related to the cache line in the multi-processor system (state and where the cache line is cached). In addition, the requirements of a "Snoop Filter" replacement algorithm are also different from the various replacement algorithms used by a processor cache 112A–112N. For example, the "Snoop Filter" will likely have "invalid" entries (the percentage of invalid entries is a function of a "Snoop Filter" coverage and the amount of sharing across multi-processor nodes). In addition, the "Snoop Filter" has no precise knowledge of the most actively used cache in a processor cache 112A–112N. For instance, a processor cache places a data line in its cache (due to a "MISS") and the "Snoop Filter" is updated. Both the processor cache 112A–112N and the "Snoop Filter" show the line as a Most-Recently-Used (MRU) line. The application continues to use the cache line in the processor 110A–110N, and the cache line is repeated marked by the processor cache as MRU (reads update the LRU status). These accesses are not visible to the "Snoop Filter" and, therefore, the same cache line can be aged because there are no successive accesses to the cache line. Lastly, a "Snoop Filter" MISS causes the cache line to be invalidated by the "Snoop Filter" because it is marked by the "Snoop Filter" as LRU. This results in filter invalidating a cache line in the processor that is being actively used. Therefore, any replacement algorithm for a "Snoop Filter" needs to use other methods besides updating on processor reads only to compensate for the lack of knowledge of the MRU lines in the processor cache.

Figure 2:
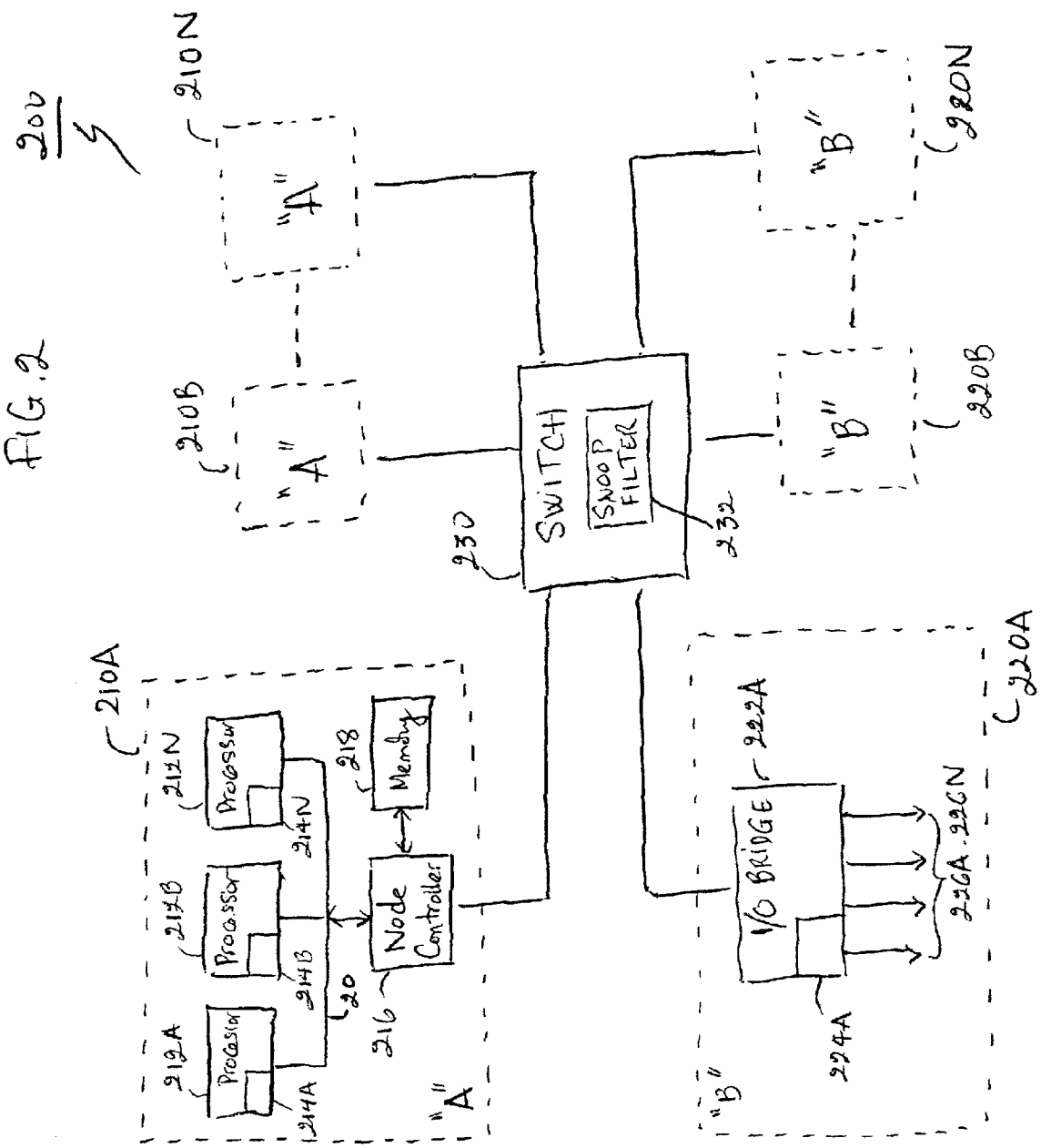
FIG. 2 illustrates an example multi-node processor system including an example "Snoop Filter" implemented to replace the least recently used (LRU) cache line according to an embodiment of the present invention.

Turning now to FIG. 2, an example multi-node processor system 200 including an example "Snoop Filter" implemented according to an embodiment of the present invention is illustrated. As shown in FIG. 2, the multi-node processor system 200 may include one or more processor nodes "A" (groups) 210A–210N, one or more I/O nodes "B" 220A–220N, and a switch 230 including an example "Snoop Filter" 232 implemented to effectively update and reflect invalid entries according to an embodiment of the present invention.

Each processor node "A" 210A–210N may include a plurality of processors 212A–212N with corresponding processor caches 214A–214N, a node controller 216 connected to the processors 212A–212N via a shared node bus 20, and a memory 218 connected to the node controller 216.

Each I/O node "B" 220A–220N may indicate an I/O bridge 222A including its own private I/O cache 224A, registers and other components (not shown) necessary to provide an interface with a variety of I/O devices via one or more PCI buses 226A–226N.

The "Snoop Filter" 232 may be organized as a 12-way set associative cache wherein each set in the cache has an associated 12-bit vector that is updated. However, such a "Snoop Filter" cache organization is not limited thereto. For example, the "Snoop Filter" 222 may also be organized as any multiple associativity sizes such as 2-way, 4-way, 8-way, 16-way, or 32-way set associative cache depending upon hardware implementation. If the "Snoop Filter" 232 is organized as a 12-way set associative cache, where each "way" is a line in the cache. Each line in the cache contains a portion of the memory address (called a tag) which is used to compare to a portion of the transaction address on a lookup, and coherency information associated with the memory address. When new data is placed in the "Snoop Filter" cache, it is assigned to an entry (or way) which the LRU stack indicates is the least recently used (LRU) entry or way (i.e., the LRU output of the LRU stack), overwriting the old data which was previously stored at the same entry (or way).

Figure 3:
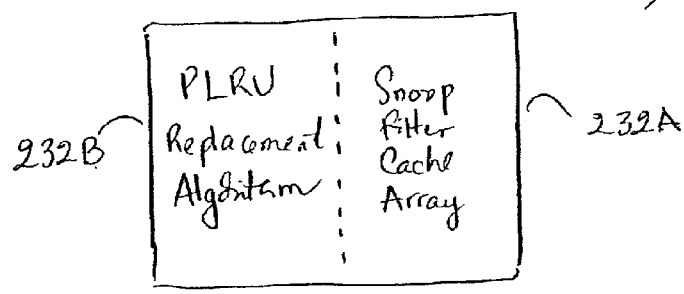
FIG. 3 illustrates an example "Snoop Filter" implemented to replace the least recently used (LRU) cache line according to an embodiment of the present invention.

As shown in FIG. 3, the "Snoop Filter" 232 contains a "Snoop Filter" cache array 232A organized as a 12-way set associative cache, a Pseudo-LRU (PLRU) replacement algorithm 232B implemented in hardware for a 12-way set associative cache design to replace the least recently used "Snoop Filter" line (or block) to reflect the lines that are replaced in the processor caches 214A–214N of respective nodes "A" 210A–210N and the I/O caches 224A of respective nodes "B" 220A–220N, and related logic such as comparator, counter and registers (not shown) that are necessary to perform the update and replace the least recently used "Snoop Filter" line. According to an embodiment of the present invention, the PLRU replacement algorithm (or mechanism) 232B requires less complex logic and does not require much high-speed cache memory to provide a fairly accurate indication of the least recently used cache line for replacement. In addition, the PLRU replacement mechanism can also be easily adaptable if the "Snoop Filter" increases the number of ways within a set.

Figure 4:
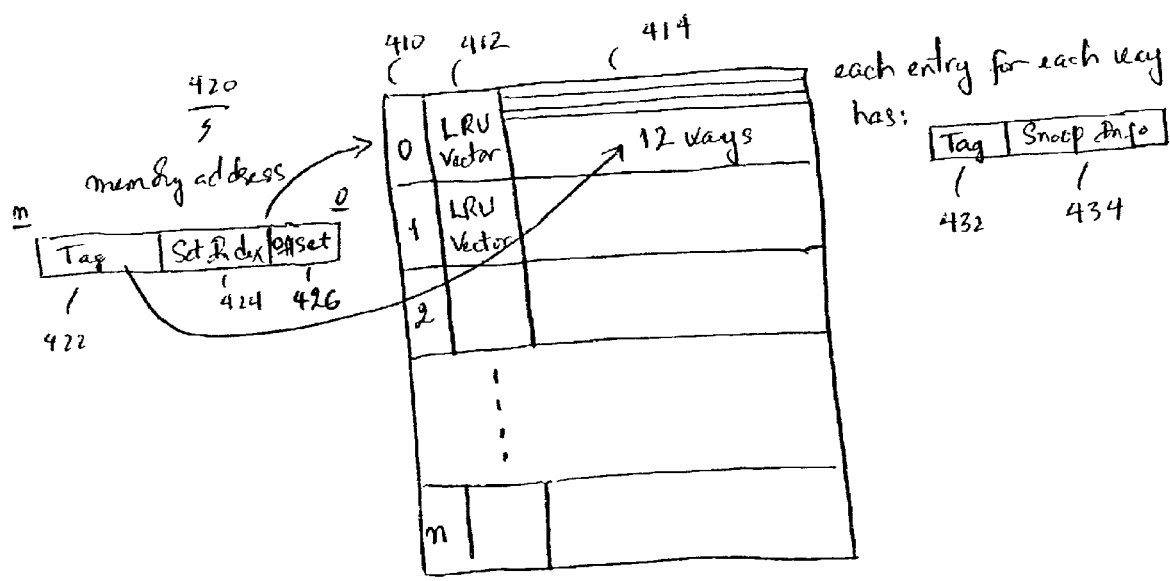
FIG. 4 illustrates an example "Snoop Filter" cache array organized according to an embodiment of the present invention.

FIG. 4 illustrates an example "Snoop Filter" cache array 232A organized as a 12-way set associative cache design according to an embodiment of the present invention. As shown in FIG. 4, the "Snoop Filter" cache array 232A includes a plurality of sets (0-n) 410 where each set is made up of a number of lines or entries 414 (12 in the case of 12-way) in the "Snoop Filter" 232; and a least-recently-used (PLRU) vector field 412, which is used to select which "entry" or "way" (equivalent to cache line of a processor cache) to replace. When an entry in the "Snoop Filter" 232 needs to be replaced, the PLRU vector field 412 provides the ID (or index) identifying which line to select for replacement.

Each set in the "Snoop Filter" cache array 232A has a vector of 12 bits as represented, for example, xxx_xxx_xxx_xxx. The 12 bits may represent the 12 entries (or 12 ways) in a set. However, if the "Snoop Filter" cache array 232A organized as an 8-way set or a 4-way set, for example, then the LRU vector has either 7 bits for an 8-way cache, or 3 bits for a 4-way cache.

A memory (entry) address 420 of a "Snoop Filter" cache entry in the "Snoop Filter" cache array 232A may be divided into three fields including a memory location tag 422 used to identify a unique cache location, a set (binary) index 424 used to identify the set of "Snoop Filter" entries (cache lines or "blocks"), and an offset 426 used to indicate the address of desired data from the "Snoop Filter" entries (cache lines). The tag 422 may be used for comparison with the tags of all the cache entries for all 12-ways to determine if there is a HIT or a MISS. If there is a HIT, the LRU bits are updated, i.e., a write is performed on the cache entry. The "way" signal is output as a result of the HIT. If there is a MISS, the LRU bits are read and the "way" signal is output so that the set in the "Snoop Filter" cache array 232A to be replaced can be discarded.

Each entry for each of the 12-ways in the "Snoop Filter" cache array 232A has a tag 432 (which is used to match on a portion of the requesting address), and "Snoop Filter" cache coherency information 434. Each set has a vector where different encodings are used to identify the LRU way within a set.

The PLRU algorithm 232B may be updated as follows: On a look-up HIT at the "Snoop Filter" 232, the selected way is updated to MRU by updating the selected LRU bits to their complement. On a lookup MISS at the "Snoop Filter" 232, the victim way is also updated to MRU by updating the selected LRU bits to their complement. In addition, the least-recently-used (LRU) can further be updated to reflect the cache lines that are replaced in the processor cache 214A–214N of respective memory nodes "A" 210A–210N including the following:

On a "Snoop Filter" update operation, the contents of the entry (see FIG. 4) may be examined to determine if the "Snoop Filter" line is currently cached in the multi-node processor system 200. In the case where the entry is no longer cached (this may occur on a processor implicit writeback "WB" with invalidate), the entry may be set to LRU (by setting the selected LRU bits). Invalidations of an entry will occur on multi-node processor systems where the processor emits clean-line-replacement hints and/or explicit writebacks "WBs". By manipulating the LRU array in this manner, invalid entries are most likely to selected on read-misses before valid entries.

On multi-node processor systems where the processor does not emit clean-line-replacement hints, or the explicit writeback "WB" with invalidate transaction is not reliable, explicit writebacks "WBs" can be used in general for setting the entry to LRU. Even if the "Snoop Filter" shows the line as cached, optimization can be achieved based on the probability that the cache line has been invalidated.

Refer back to FIG. 4, each set in the "Snoop Filter" cache array 232A has an associated 12-bit vector that is updated. The LRU "way" may be determined by the values provided in TABLE shown below.

| Victim Way | LRU[11:8] | LRU[8:6] | LRU[5:3] | LRU[2:0] |
|---|---|---|---|---|
| 0 | x00 | xxx | xxx | 0x0 |
| 1 | x00 | xxx | xxx | 0x1 |
| 2 | x00 | xxx | xxx | 10x |
| 3 | x00 | xxx | xxx | 11x |
| 4 | 0x1 | xxx | 0x0 | xxx |
| 5 | 0x1 | xxx | 0x1 | xxx |
| 6 | 0x1 | xxx | 10x | xxx |
| 7 | 0x1 | xxx | 11x | xxx |
| 8 | 11x | 0x0 | xxx | xxx |
| 9 | 11x | 0x1 | xxx | xxx |
| 10 | 11x | 10x | xxx | xxx |
| 11 | 11x | 11x | xxx | xxx |

In order to set an entry (way) as MRU, the selected LRU bits may be set to their complement. For example, on a HIT to Way#0, the LRU vector may be updated to its complement from "x00_xxx_xxx_0x0" to "x11_xxx_xxx_1x1" where "x" signifies a bit value that remains unchanged.

To set an entry (way) to LRU, the 12-bit vector for the entry (way) may be updated to reflect the LRU value. For example, to make way#8 LRU, the 12-bit vector may be updated to "11x_0x0_xxx_xxx" as indicated in the TABLE where "x" signifies that the bit value remains unchanged. Likewise, to make way#9 LRU, the 12-bit vector may be updated to "11x_0x1_xxx_xxx" as indicated in the TABLE where "x" signifies that the bit value remains unchanged. Similarly, to make way#11 LRU, the 12-bit vector may be updated to "11x_11x_xxx_xxx" as indicated in the TABLE where "x" signifies that the bit value remains unchanged.

FIG. 5 illustrates an example flowchart of the PLRU replacement algorithm 232B implemented in the "Snoop Filter" 232 according to an embodiment of the present invention. The PLRU replacement algorithm 232B may be triggered upon receipt of a processor transaction, i.e., processor requests for memory that get filtered to the "Snoop Filter" 232. There are 4 types of transactions, including: (1) a processor memory read—as a result of a processor cache MISS (RM); (2) a processor read for ownership (RO); (3) a clean line replacement (CLR); and (4) a processor write (W). These transactions for the "Snoop Filter" 232 are different from transactions for the processor caches 214A–214N of respective memory nodes "A" 210A–210N or the I/O cache 224A of respective memory nodes "B 220A–220N. Based on these transactions which include memory addresses as described with reference to FIG. 4, the "Snoop Filter" 232 may update its contents accordingly.

As shown in FIG. 5, when the processor transaction is received at the "Snoop Filter" 232 at block 510, the PLRU replacement algorithm 232B determines if the processor transaction is one of a processor memory read (RM), a processor read for ownership (RO), a clean line replacement (CLR), and a processor write (W).

If the processor transaction is either a processor memory read (RM) or a processor read for ownership (RO), the PLRU replacement algorithm 232B may look up the "Snoop Filter" cache array 232A to determine if the "Snoop Filter" cache array 232A has a "Snoop Filter" cache line associated with a memory address that a processor 212A–212N from respective processor nodes "A" (groups) 210A–210N is requesting at block 512. Specifically, the PLRU replacement algorithm 232B may identify a memory address of the processor memory read (RM) or the processor read for ownership (RO) and compare its tag with the tags of all the "Snoop Filter" cache entries for all 12-ways to determine if there is a HIT or a MISS.

If there is a HIT, the PLRU replacement algorithm 232B may select the corresponding way as MRU, that is, to update the LRU entry for MRU at block 514. However, if there is a MISS, the PLRU replacement algorithm 232B may select a "Snoop Filter" cache line replacement, that is, a victim way is selected using LRU vector at block 516, and the victim way is made as MRU at block 518.

If the processor transaction is either a clean line replacement (CLR) or a processor write (W), the PLRU replacement algorithm 232B may look up the "Snoop Filter" cache array 232A for the "Snoop Filter" cache line update at block 520, and make the corresponding HIT way as LRU at block 522. Since the "Snoop Filter" 232 has information about all cache lines in the multi-node processor system 200, there is no need to determine if there is a HIT or a MISS. A way is selected in response to the CLR/W transaction and the HIT way is made LRU to be updated or replaced at block 522.

As described in the foregoing, the PLRU algorithm can effectively reflect invalid entries in the "Snoop Filter" while obtaining the benefits of LRU in the snoop filter conflict and capacity misses, with invalid entries being selected before valid entries.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the computer system as shown in FIG. 2 may be configured differently or employ some or different components than those illustrated. In addition, the "Snoop Filter" cache array may be configured differently or employ some or different components than those illustrated without changing the basic function of the invention. Further, the PLRU algorithm may be configured to perform the tasks as shown in FIG. 5 slightly differently. Many modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A Snoop Filter for use in a multi-node processor system including different nodes of multiple processors and corresponding processor caches, comprising:

a cache array to store data information in a plurality of lines; and a replacement mechanism responsive to a processor transaction to identify a least-recently-used (LRU) line from the plurality of lines in the cache array for update to reflect lines that are replaced in one or more processor caches.

2. The Snoop Filter as claimed in claim 1, wherein the processor transaction indicates one of a processor memory read—as a result of a processor cache MISS (RM), a processor read for ownership (RO), a clean line replacement (CLR), and a processor write (W).

3. The Snoop Filter as claimed in claim 1, wherein the cache array is a set-associative cache.

4. The Snoop Filter as claimed in claim 1, wherein the cache array comprises:

a plurality of sets where each set is made up of a number of lines in the Snoop Filter; and a least-recently-used (PLRU) vector field to select which line or way to replace.

5. The Snoop Filter as claimed in claim 4, wherein each set in the cache array has a vector of "n" bits depending on the associativity of the cache which can be decoded to identify the PLRU way within the set.

6. The Snoop Filter as claimed in claim 5, wherein each processor transaction includes an address where a portion of the address is used to identify the set (set index), and another portion of the address is used to uniquely identify the line in the Snoop Filter.

7. The Snoop Filter as claimed in claim 6, wherein the Pseudo Least-Recently-Used (PLRU) replacement mechanism is configured to determine if there is a HIT or a MISS in response to receipt of the processor transaction, and when there is a HIT, set an entry (way) as a most-recently used (MRU) and update selected LRU bits to their complement, or when there is a MISS, set an entry (way) to MRU.

8. The Snoop Filter as claimed in claim 1, wherein the PLRU replacement mechanism is configured to:

determine if the processor transaction is one of a processor memory read (RM) and a processor read for ownership (RO);

if the processor transaction is one of a processor memory read (RM) and a processor read for ownership (RO), determine if the cache array has a line associated with the processor transaction;

if the cache array has a line associated with the processor transaction indicating a HIT condition, select a corresponding entry (way) as a most-recently used (MRU); and if the cache array does not have a line associated with the processor transaction indicating a MISS condition, select a victim entry (way) using a LRU vector and make the victim entry (way) as MRU.

9. The Snoop Filter as claimed in claim 8, wherein the PLRU replacement mechanism is further configured to:

determine if the processor transaction is one of a clean line replacement (CLR) and a processor write (W); and if the processor transaction is one of a clean line replacement (CLR) and a processor write (W), select a corresponding way as LRU.

10. A Pseudo Least-Recently-Used (PLRU) replacement method for a multi-node Snoop Filter including a plurality of lines storing data information, comprising:

determining if a processor transaction is one of a processor memory read (RM), a processor read for ownership (RO), a clean line replacement (CLR), and a processor write (W);

determining if a Snoop Filter cache array has a line associated with the processor transaction, if the processor transaction is one of the processor memory read (RM) and the processor read for ownership (RO);

if the cache array has a line associated with the processor transaction indicating a HIT condition, selecting a corresponding entry (way) as a most-recently used (MRU);

if the cache array does not have a line associated with the processor transaction indicating a MISS condition, selecting a victim entry (way) using a LRU vector and making the victim entry (way) as MRU; and selecting a corresponding way as LRU, if the processor transaction is one of the clean line replacement (CLR) and the processor write (W).

11. The Pseudo Least-Recently-Used (PLRU) replacement method as claimed in claim 10, wherein the Snoop Filter is organized as a set-associative cache.

12. The Pseudo Least-Recently-Used (PLRU) replacement method as claimed in claim 11, wherein the Snoop Filter cache comprises:

a plurality of sets where each set is made up of a number of lines in the Snoop Filter; and a least-recently-used (PLRU) vector field to select which line or way to replace.

13. The Pseudo Least-Recently-Used (PLRU) replacement method as claimed in claim 12, wherein each set in the cache array has a vector of "n" bits depending on the associativity of the cache which can be decoded to identify the PLRU way within the set.

14. A multi-node processor system, comprising:

one or more processor nodes each including a plurality of processors with processor caches;

one or more I/O nodes each including an I/O bridge with a private I/O cache; and a Snoop Filter operatively connected to the processor nodes and the I/O nodes to manage data information related to cache lines in one or more processor caches, said Snoop Filter comprising a cache array to store data information in a plurality of lines, and a Pseudo Least-Recently-Used (PLRU) replacement mechanism responsive to a processor transaction to identify a least-recently-used (LRU) line from the plurality of lines in the cache array for update to reflect lines that are replaced in one or more processor caches.

15. The multi-node processor system as claimed in claim 13, wherein the processor transaction indicates one of a processor memory read—as a result of a processor cache MISS (RM), a processor read for ownership (RO), a clean line replacement (CLR), and a processor write (W).

16. The multi-node processor system as claimed in claim 14, wherein the cache array is a set-associative cache.

17. The multi-node processor system as claimed in claim 14, wherein the cache array comprises:

a plurality of sets where each set is made up of a number of lines in the Snoop Filter; and a least-recently-used (PLRU) vector field to select which line or way to replace.

18. The multi-node processor system as claimed in claim 17, wherein each set in the cache array has a vector of "n" bits depending on the associativity of the cache which can be decoded to identify the PLRU way within the set.

19. The multi-node processor system as claimed in claim 18, wherein each processor transaction contains an entry address of an entry (way) in the cache array including a memory location tag used to identify a unique cache entry, and a set index used to identify the set of entries.

20. The multi-node processor system as claimed in claim 14, wherein the Pseudo Least-Recently-Used (PLRU) replacement mechanism is configured to determine if there is a HIT or a MISS in response to receipt of the processor transaction, and when there is a HIT, set an entry (way) as a most-recently used (MRU) and update selected LRU bits to their complement, or when there is a MISS, set an entry (way) to MRU.

21. The multi-node processor system as claimed in claim 14, wherein the PLRU replacement mechanism is configured to:

determine if the processor transaction is one of a processor memory read (RM) and a processor read for ownership (RO);

if the processor transaction is one of a processor memory read (RM) and a processor read for ownership (RO), determine if the cache array has a line associated with the processor transaction;

if the cache array has a line associated with the processor transaction indicating a HIT condition, select a corresponding entry (way) as a most-recently used (MRU); and if the cache array does not have a line associated with the processor transaction indicating a MISS condition, select a victim entry (way) using a LRU vector and make the victim entry (way) as MRU.

22. The multi-node processor system as claimed in claim 21, wherein the PLRU replacement mechanism is further configured to:

determine if the processor transaction is one of a clean line replacement (CLR) and a processor write (W); and if the processor transaction is one of a clean line replacement (CLR) and a processor write (W), select a corresponding way as LRU.

* * * * *